Figures 1, 2:
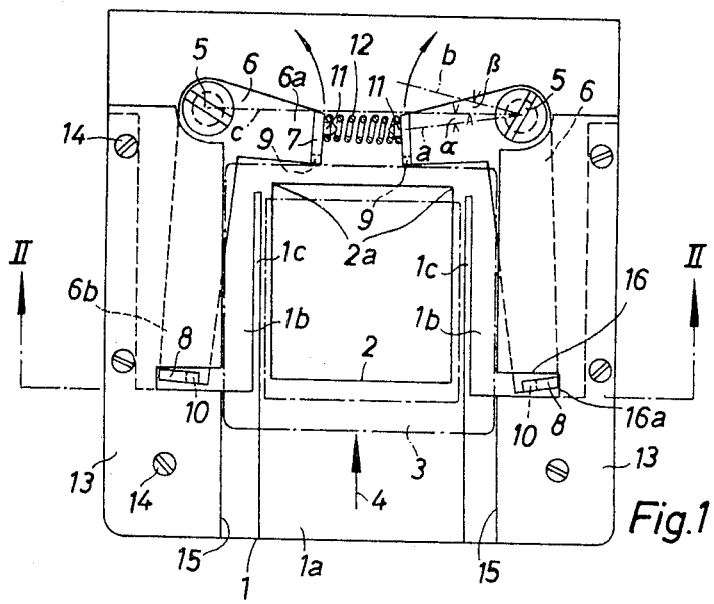

Oct. 25, 1966    G. BRANDT    3,280,695
HOLDER FOR TRANSPARENT PHOTOGRAPHS AND THE LIKE
Filed Jan. 21, 1964

INVENTOR.
GOTTFRIED BRANDT
BY
Michael J. Striker

United States Patent Office 3,280,695
Patented Oct. 25, 1966

3,280,695
HOLDER FOR TRANSPARENT PHOTOGRAPHS
AND THE LIKE
Gottfried Brandt, Munich, Germany, assignor to Agfa
Aktiengesellschaft, Leverkusen, Germany
Filed Jan. 21, 1964, Ser. No. 339,269
Claims priority, application Germany, Jan. 24, 1963,
A 19,442
9 Claims. (Cl. 88—24)

The present invention relates to holders for transparent photographs. The term "transparent photographs" is intended to cover articles such as negatives, transparencies, color negatives, and the like. In other words, the expression "transparent photographs" is intended to cover all types of photographs which are capable of providing an image when inserted into a projector, enlarger, or the like.

When transparent photographs are inserted in photograph apparatus of the above type it is of course necessary to properly position the photographs, and for this purpose holders are provided for holding the photographs. For example, it is known to provide a device where when a photograph approaches its predetermined position on the device it engages an element and moves it in one direction so as to automatically cause a pair of centering elements to move toward each other and engage a pair of opposed side edges of the photograph, at an outer frame thereof, for example, for properly positioning the photograph, these elements which engage the photograph moving toward each other in a direction which is transverse to the direction of movement of the element which is engaged by the photograph to initiate the movement of the elements which move toward each other. Structures of this type generally engage a side edge of the photograph along the entire length of the side edge, and it is extremely important to construct such devices with a very great accuracy so as to enable it to precisely orient the photograph properly on the holding device so that the photograph will be properly aligned with an aperture through which the light can pass to provide an image of the photograph. As a result, known structures of this type are quite expensive to manufacture.

It is accordingly a primary object of the present invention to provide a relatively simple and inexpensive holder for transparent photographs, and the holder of the invention while simple and inexpensive nevertheless is capable of positioning the photograph with a very high degree of accuracy.

A further object of the present invention is to provide a structure of the above type where while the photograph can be positioned accurately nevertheless it becomess unnecessary to have the photograph engaged by positioning elements which respectively extend along substantially the entire lengths of a pair of opposed side edges of the photograph.

Furthermore, it is an object of the present invention to provide a structure of the above type which is capable of automatically assuming a position engaging and properly positioning a photograph after the engaging structure has been moved through a certain minimum and quite small distance.

It is furthermore an object of the present invention to provide a structure of the above type which is very easy to use and which is small and compact so that there is no difficulty about using the device of the invention with conventional enlargers or the like.

With the above objects in view, the invention includes, in a holder for transparent photographs or the like, a plate which is formed with a substantially rectangular aperture with which a transparent photograph is adapted to be aligned when the photograph is in a predetermined position on the plate, this plate supporting, in accordance with the invention, a pair of bell cranks for turning movement respectively about a pair of axes which pass through the plate and which are respectively located adjacent to a pair of adjoining corners of the aperture. These bell cranks of the invention respectively have a first pair of elongated arms which respectively extend generally along a pair of opposed side edges of the aperture and which respectively terminate in free end portions which move toward each other when the bell cranks turn from a non-engaging position to an engaging position engaging the photograph for holding the latter in the above-mentioned predetermined position, and these end portions respectively carry a pair of means for engaging the photograph at opposed side edges thereof. The bell cranks of the invention have, in addition, a second pair of arms which respectively extend toward each other from the turning axes of the bell cranks generally along a third side of the aperture, and this second pair of arms terminates in a pair of free ends which respectively carry projections formed with V-notches which receive an edge of a photograph while the latter is advanced toward the predetermined position relative to the plate, so that it is the movement of the photograph itself into engagement with the projections of the second pair of arms which initiates the turning of the bell cranks to place the latter in their engaging position engaging the photograph to properly locate the latter relative to the aperture of the plate, and the V-notches of the projections of the second pair of arms participating in the proper location of the photograph on the plate. According to a further feature of the invention an over-center spring means is operatively connected to the second pair of arms for automatically turning the latter in directions which displace the end portions of the first pair of arms toward each other after the second pair of arms have been moved by the photograph, while the latter is advanced toward its predetermined position relative to the plate, through a distance sufficient to displace the overcenter spring means beyond its dead center position.

It will be seen that the novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a top plan view of one possible embodiment of the structure according to the present invention; and FIG. 2 is a transverse sectional view taken along line II–II of FIG. 1 in the direction of the arrows.

Referring to FIG. 1, there is shown therein a plate 1 which forms the support structure for the holder of the invention, this plate 1 being adapted to be received, for example, in an enlarger where a conventional enlarger normally receives a negative or the like. The plate 1 is formed at its upper face with a relatively wide groove 1a extending from the edge shown in the lower part of FIG. 1, and at the area of the plate 1 which is formed with a groove 1a, this plate is also formed with the aperture 2 which may have a rectangular configuration, for example, although the aperture 2 shown in the drawing is square. A pair of elongated relatively wide grooves 1b are respectively located at opposite sides of the groove 1a, and there remains between the grooves 1b and the groove 1a a pair of elongated ribs 1c which have upper surfaces which will support the transparent photograph which may be mounted in a suitable frame. The surface of the plate 1 at the upper portion thereof shown in FIG. 1 is at the same elevation as the surface of the plate within the grooves 1a and 1b, and thus the plate 1 in effect has at its opposite side portions, as viewed in FIG. 1, raised substantially U-shaped portions. The transparent photograph is moved in the direction of the arrow 4 shown in FIG. 1 toward a predetermined position where the photograph will be aligned with the aperture 2, and during this movement the photograph rests on the raised portions of the plate 1.

A pair of bell cranks 6 are carried by the plate 1 for pivotal movement about a pair of axes which extend through the plate 1 and which are respectively located adjacent to the adjoining corners 2a of the aperture 2, and for this purpose a pair of screw members 5 are threaded into openings of the plate 1 and pass freely through openings formed in the bell cranks 6 so as to support the latter for turning movement in the manner shown in FIG. 1. These bell cranks respectively have a pair of elongated arms 6b which extend along the interior of the grooves 1b in a direction which is generally parallel to the opposed side edges of the aperture 2, and in addition the bell cranks respectively have a pair of arms 6a which extend from the turning axes of the bell cranks toward each other along the upper side of the aperture 2 which is shown in FIG. 1 in a direction generally parallel thereto. The elongated arms 6b each has a free end portion terminating in an engaging means for engaging a side edge portion of the transparent photograph 3, and the engaging means 8 of each arm 6b is in the form of an upwardly directed projection carried by the arm and formed with a V-notch 10, as is clearly apparent from FIG. 2. The arms 6a respectively terminate in free end portions which carry actuating means which are adapted to be engaged by an edge of the photograph 3 so as to actuate the engaging means 8 for moving the latter simultaneously toward each other into engagement with opposed side edges of the photograph 3, and the actuating means carried by each arm 6a takes the form of a projection 7 similar to the projection 8 and formed with a V-notch 9 which is similar to the notch 10 and which receives an edge portion of the photograph 3 while the latter is advanced in the direction of the arrow 4, so that the notches 9 of the actuating means or projections 7 will also participate in the holding of the photograph 3 in a predetermined position with respect to the aperture 2 where the photograph 3 is properly aligned therewith and held in a plane which will enable the image to be properly projected.

According to a further feature of the present invention, an overcenter spring means is provided for automatically turning the bell cranks 6 in directions which displace the engaging means 8 toward each other once the overcenter spring means has been moved by the advance of the photograph in direction of the arrow 4 beyond the dead center position of the overcenter spring means, and this overcenter spring means is operatively connected to the arms 6a of the bell cranks. In the particular example illustrated, which is a preferred structure, the free ends of the arms 6a respectively carry a pair of pins 11 which respectively extend into the ends of an elongated coil spring 12 which is compressed between the free ends of the arms 6a. Thus, the spring 12 forms the overcenter spring means, and the dead center of the overcenter spring means is located along the line c which extends between the turning axes of the pair of bell cranks in a direction parallel to the axis of the compression spring 12.

The elongated arms 6b of course turn within the grooves 1b at the outer sides of the ribs 1c, and the grooves 1b are respectively covered by a pair of plates 13 which are mounted by screws 14 on the raised substantially U-shaped portions of the plate 1 located at the opposite sides thereof, as described above. These plates 13 have inner side edges 15 directed toward each other and extending in the direction of the arrow 4, and these side edges are adapted to be located closely adjacent to the side edges of the photograph 3 to guide the latter for movement in the direction of the arrow 4. The pair of plates 13 are respectively formed with notches 16 extending inwardly from their inner side edges and the projections 8 extend upwardly through the notches 16 and are freely movable therein, the inner ends 16a of the notches 16 form stop edges which limit the movement of the arms 6b away from each other.

The parts are shown in FIG. 1 where the overcenter spring 12 is located between the aperture 2 and the line which connects the turning axes of the bell cranks, this line c having been referred to above, and in this position the spring urges the bell cranks to turn in directions which urge the projections 8 against the stop edges 16a, so that the structure will remain in the illustrated rest position ready to receive a photograph 3. The line a between each turning axis and the joining end of the spring 12 makes with the line c, which is the dead center line of the overcenter spring as described above, an angle α. When the operator moves the framed photograph 3 in the direction of the arrow 4, as described above, the edge of the photograph which is shown at the upper part of FIG. 1 will be received in the notches 9 of the pair of actuating means 7 and the pair of actuating means 7 will be moved by the movement of the photograph also generally in the direction of the arrow 4, so that the spring means 12 is displaced toward its dead center position where the pair of pins 11 are aligned with the line c and where, of course, this spring 12 is compressed to the greatest extent. The further movement of the photograph 3 beyond the location where the spring is in its dead center position is of course carried out very easily since the spring 12 now contributes to the movement of the projections 7 in the general direction of the arrow 4 since once the spring 12 has been displaced beyond its dead center position it will of itself urge the pair of bell cranks in the directions of the arrows shown at the upper part of FIG. 1, and thus it now becomes very easy to move the photograph 3 to its predetermined position where it is properly aligned with the aperture 2 since the movement of the bell cranks is brought about at this time by the spring 12 which thus makes the continued movement of the photograph 3 very easy to carry out. Thus, once the spring 12 has been displaced beyond its dead center position the movement of the bell cranks will be brought about not only by the movement of the photograph but also by the spring 12, and the bell cranks will continue to turn in directions which move their arms 6b toward each other until the free ends of these arms respectively nearly engage the ribs 1c, and in this position the line from the turning axis of each bell crank to the adjoining pin 11 will extend along a line b shown in FIG. 1, and this line makes an angle β with the line c. The side edges of the photograph are located outwardly beyond the ribs 1c by a distance which is sufficient to prevent the free ends of the arms 6b from reaching the ribs 1c as long as a photograph is present. It could happen that the spring 12 presses the projections 8 against the photograph 3, before the latter has reached its proper position above the opening 3. But the closing power of the spring 12 is so small that the photograph is able to reach its end position despite the projections 8 already being closed. Thus, the photograph will be centered on the one hand by the notches 9 and on the other hand by the notches 10 which now extend over and engage opposed side edge portions of the photograph 3. The angle β is several times greater than the angle α, and it is therefore only necessary to exert a relatively small force through a relatively small distance in order to bring about the operations which place the holder of the invention in a position properly holding the photograph aligned with the aperture 2, and in the holding position the spring 12 provides a relatively large turning moment on the bell cranks because of the larger angle β, while a relatively small force is required to displace the spring 12 from its initial position shown in FIG. 1 to the dead center position because of the relatively small moment arm in this position of the parts. Thus, the force with which the structure holds the photograph in its position properly aligned with the aperture 2 is considerably greater than the force required to release the structure for movement to its holding position.

For removing the framed photograph the operator only has to push the projections 7 towards the aperture 2.

Although a coiled compression spring 12 is preferred for the overcenter spring means, as described above, because of its simplicity and because of the small space which it occupies, it is possible to use instead a curved leaf spring which in a known way can act as an overcenter spring, and it is of course also possible to use an elongated tension spring as an overcenter spring means. Moreover, it is possible to extend the dimensions of the projections 7 and 8 in the directions of the edges of the photograph so as to provide a relatively large area of contact between these projections and the photograph and thus reduce any tendency to deform the frame of the photograph at the edge portions thereof. For example, the levers can be provided with projections which are bent upwardly from the levers, which extend perpendicularly with respect to the projections 7 and 8, and which have a V-shaped cross sectional configuration so as to cooperate with the edges of the photograph along substantial portions of the length thereof.

While the above-described structure is preferred because of its simplicity and ease of operation, it is also possible to interconnect the arms 6a of the bell cranks by a pin-and-slot connection and to provide only one projection 7 to be engaged by the photograph, so that with such a construction the turning movement of one of the bell cranks will be transmitted to the other through the pin-and-slot connection which constrains both the bell cranks to turn equally in opposite directions, and the fact that only one projection 7 would be available with such a construction would not at all detract from the accuracy of the positioning of the photograph since only three positioning points of the bell cranks need engage the photograph for the purpose of properly determining the position thereof in alignment with the aperture 2. In other words three points can determine the position of the photograph so that a pair of projections 8 and only one projection 7 are all that are required for determining the position of the photograph 3.

While the above-described structure of the invention is particularly suitable for photographic copying devices such as enlargers and the like, it is of course also possible without changing the structure to use the invention in other types of photographic projecting apparatus.

It will be understood that each of the elements described above, or two or more together, may also find a useful application in other types of holders differing from the types described above.

While the invention has been illustrated and described as embodied in photograph holders, it is not intended to be limited to the details shown, since various modificaions and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A holder for a transparent photograph or the like, comprising, in combination, a plate formed with an aperture with which the photograph is adapted to be aligned; engaging means movably carried by said plate for movement between an engaging position engaging the photograph and holding the latter properly aligned with respect to said aperture and a non-engaging position out of engagement with the photograph; actuating means operatively connected to said engaging means for actuating the latter to move from said non-engaging to said engaging position thereof, said actuating means including at least one projection located in the path of movement of the photograph toward its position properly aligned with respect to said aperture to be engaged and moved by the photograph for actuating said engaging means to move from said non-engaging to said engaging position thereof, said projection being adapted to engage an edge portion of the photograph for participating in the location thereof relative to said aperture; and biasing means cooperating with said engaging means for urging the latter toward said engaging position thereof after the photograph has engaged said projection of said actuating means and has moved the latter through a predetermined distance, said biasing means urging said engaging means toward said non-engaging position thereof prior to movement of said actuating means through said predetermined distance.

2. A holder for transparent photographs or the like, comprising, in combination, a plate formed with an aperture with which a photograph is adapted to be aligned when in a predetermined position on said plate; engaging means movably carried by said plate for movement between an engaging position engaging the photograph at opposite side edge portions thereof for holding said photograph in said predetermined position and a non-engaging position spaced from the photograph, said engaging means including a pair of engaging portions respectively located at opposite sides of the photograph; actuating means operatively connected to said engaging means for actuating the latter to move from said non-engaging to said engaging position thereof, said engaging portions simultaneously moving toward each other and into engagement with said photograph for maintaining the latter in said predetermined position when said engaging means moves from said non-engaging to said engaging position thereof, said actuating means including at least one projection located in the path of movement of said photograph toward said predetermined position thereof to be engaged by an edge of said photograph and moved by the photograph itself while the latter approaches said predetermined position for actuating said engaging means to move from said non-engaging to said engaging position thereof, said projection also participating in the positioning of the photograph at said predetermined position; and biasing means cooperating with said engaging means for urging the latter toward said engaging position thereof after the photograph has engaged said projection of said actuating means and has moved the latter through a predetermined distance, said biasing means urging said engaging means toward said non-engaging position thereof prior to movement of said actuating means through said predetermined distance.

3. A holder for transparent photographs or the like, comprising, in combination, a plate formed with a rectangular aperture with which the photograph is adapted to be aligned when said photograph is in a proper position relative to said plate; a pair of bell cranks pivotally carried by said plate beyond said aperture and respectively adjacent to a pair of adjoining corners of said aperture, said bell cranks respectively having one pair of arms which terminate in end portions respectively located at opposite sides of said aperture for movement during turning of said bell crank toward opposite sides of the photograph, and said bell cranks respectively having a second pair of arms extending toward each other and generally along the same side of said aperture, said one pair of arms respectively carrying at their end portions engaging elements which engage opposite sides of the photograph when said bell cranks turn to move said end portions of said one pair of arms toward each other, and said second pair of arms respectively having projections located in the path of movement of an edge of the photograph to be engaged and moved thereby for turning said bell cranks in directions which displace said end portions of said one pair of arms toward each other to engage the photograph and properly position the latter, said projections which are carried by said second pair of arms of said bell cranks respectively being formed with V-notches which receive an edge of the photograph when engaged thereby for turning said bell cranks, so that said projections of said second pair of arms also participate in the location of the photograph at said proper position.

4. A holder for transparent photographs, comprising, in combination, a plate formed with a rectangular aperture with which a transparent photograph is adapted to be aligned when said photograph is in a predetermined position; a pair of bell cranks pivotally carried by said plate for turning movement about a pair of axes, respectively, which extend perpendicularly through said plate and which are respectively adjacent a pair of adjoining corners of said aperture, said bell cranks respectively having a first pair of elongated arms which extend generally along a pair of opposed sides of said aperture and which respectively terminate in a pair of end portions which approach each other during turning of said pair of bell cranks respectively in a pair of given directions, said end portions respectively carrying a pair of means for engaging the photograph at opposed side edges thereof for properly positioning the photograph at said position relative to said aperture, and said pair of bell cranks respectively having a second pair of arms which extend respectively from said turning axes toward each other generally along a third side of said aperture, said second pair of arms respectively terminating in end portions which respectively carry a pair of projections adapted to be engaged by an edge of the photograph to be turned by movement of the photograph itself toward said predetermined position for turning the bell crank and displacing said end portions of said first pair of arms toward each other; and overcenter spring means operatively connected to said second pair of arms for automatically displacing the latter in directions which turn said end portions of said first pair of arms toward each other after the photograph has engaged said projections of said second pair of arms and moved the latter through a distance sufficient to displace said spring means beyond the dead center position thereof, said projections of said second pair of arms respectively being formed with V-notches for engaging an edge portion of the photograph and participating in the proper positioning thereof relative to said aperture.

5. A holder as recited in claim 4 and wherein said overcenter spring means is in the form of an elongated compression spring located between and engaging said end portions of said second pair of arms.

6. A holder as recited in claim 5 and wherein said second pair of arms respectively carry centering pins which respectively extend into opposed ends of said compression spring.

7. A holder for transparent photographs, comprising, in combination, a plate formed with a substantially rectangular aperture with which a photograph is adapted to be aligned when the photograph is in a predetermined position relative to said plate; a pair of bell cranks turnably carried by said plate for respective turning movement about a pair of axes which extend through said plate and which are respectively adjacent to a pair of adjoining corners of said aperture, said bell cranks respectively having a first pair of elongated arms respectively extending generally along a pair of opposed sides of the aperture and respectively terminating in free end portions which respectively carry a pair of means for engaging opposed side edges of the photograph and properly positioning the latter when said pair of arms turn in directions which displace said end portions thereof toward each other, said bell cranks respectively having a second pair of arms which extend toward each other generally along a third side of said aperture and which respectively terminate in free end portions which respectively carry projections adapted to be engaged by an edge of the photograph to be moved while the photograph advances toward said predetermined position for turning said end portions of said first pair of arms toward each other, said projections of said second pair of arms being respectively formed with V-notches for receiving an edge of the photograph and participating in the location thereof at said predetermined position; and overcenter spring means operatively connected to said second pair of arms for automatically turning said bell cranks in directions which displace said end portions of said first pair of arms toward each other after said spring means has passed through the dead center position thereof, said bell cranks respectively having non-engaging positions where said end portions of said first pair of arms are displaced from the area occupied by a photograph when the latter is in said predetermined position and engaging positions where said latter end portions are closer to each other and engage the photograph at opposed side edge portions thereof, and said spring means when said bell cranks are in their non-engaging positions thereof being located closer to said dead center position than when said bell cranks are in said engaging positions thereof so that said bell cranks need only be displaced through a relatively short distance before reaching said dead center position of said spring means.

8. A holder as recited in claim 7 and wherein said bell cranks respectively having angular positions, when said spring means is in said dead center position thereof, which are displaced from said engaging positions of said bell cranks by angular distances respectively several times greater than the angular distances between said bell cranks when said spring means is in said dead center position thereof and said bell cranks when in their non-engaging positions.

9. A holder for transparent photographs or the like, comprising, in combination, a plate formed with a substantially rectangular aperture with which a photograph is adapted to be aligned when the photograph is in a predetermined position relative to said plate; a pair of bell cranks respectively carried by said plate for turning movement about a pair of axes which extend through said plate and which are respectively adjacent to a pair of adjoining corners of said apertures, said bell cranks respectively having a first pair of elongated arms respectively extending generally along a pair of opposed sides of said aperture and respectively terminating in free end portions which respectively carry projections which are adapted to move toward each other during turning of said bell cranks from a non-engaging position where said projections are displaced from a pair of opposed side edges of a photograph and an engaged position where said projections extend over a pair of opposed side edges of a photograph, said projections respectively being formed with V-notches which receive the opposed side edge portions of the photograph when said bell cranks are in their engaged position, so that said projections properly center the photograph relative to the aperture, and said bell cranks respectively having a pair of second arms extending respectively from said axes toward each other generally along a third side of said aperture and respectively terminating in free end portions which respectively carry projections adapted to be engaged by a photograph during movement thereof toward said predetermined position, said latter projections of said second pair of arms also being formed with V-notches for receiving an edge of said photograph and for participating in the location of the photograph at said predetermined position thereof; and overcenter spring means operatively connected to said second pair of arms for automatically displacing said bell cranks toward said engaging position thereof after said bell cranks have been turned beyond the position where said overcenter spring means is in said dead center position thereof.

References Cited by the Examiner

FOREIGN PATENTS 225,031  12/1962  Austria.

NORTON ANSHER, *Primary Examiner.*

RICHARD A. WINTERCORN, *Assistant Examiner.*